United States Patent

Senba et al.

Patent Number: 5,779,783
Date of Patent: Jul. 14, 1998

[54] COMPOSITION FOR PRINTING INKS

[75] Inventors: Hideki Senba; Hiroki Inoue, both of Osaka; Yoshiaki Hayashi, Hyogo; Makoto Akita; Keisuke Ito, both of Osaka, all of Japan

[73] Assignee: Sumitomo Chemical Company, Limited, Osaka, Japan

[21] Appl. No.: 935,825

[22] Filed: Sep. 23, 1997

Related U.S. Application Data

[63] Continuation of Ser. No. 814,059, Mar. 10, 1997, abandoned, which is a continuation of Ser. No. 305,482, Sep. 13, 1994, abandoned.

[30] Foreign Application Priority Data

Sep. 14, 1993 [JP] Japan ................... 5-228886

[51] Int. Cl.$^6$ .................................. C09B 67/50
[52] U.S. Cl. .................. 106/410; 106/31.75; 106/31.76; 106/411; 106/413; 106/493; 106/494; 106/495; 106/497; 106/498
[58] Field of Search .................. 106/494, 495, 106/497, 498, 410, 411, 413, 493, 31.75, 31.76

[56] References Cited

U.S. PATENT DOCUMENTS

| | | | |
|---|---|---|---|
| 4,256,507 | 3/1981 | Kranz et al. | 106/495 |
| 4,310,359 | 1/1982 | Ehashi et al. | 106/494 |
| 4,317,682 | 3/1982 | Katsura et al. | 106/493 |
| 4,986,852 | 1/1991 | Dietz et al. | 106/498 |
| 5,137,576 | 8/1992 | Macholdt et al. | 106/494 |
| 5,250,108 | 10/1993 | Tanaka et al. | 106/31.43 |
| 5,324,354 | 6/1994 | Jesse et al. | 106/494 |

FOREIGN PATENT DOCUMENTS

| | | |
|---|---|---|
| 2013679 | 10/1990 | Canada . |
| 0 485 337 | 5/1992 | European Pat. Off. ...... 106/497 |
| 39-16787 | 8/1939 | Japan . |
| 50-4019 | 2/1975 | Japan . |
| 55-108466 | 8/1980 | Japan . |
| 63-213569 | 9/1988 | Japan . |
| 01-34268 | 7/1989 | Japan . |
| 01-213366 | 8/1989 | Japan . |
| 2058813 | 4/1981 | United Kingdom . |

*Primary Examiner*—Mark L. Bell
*Assistant Examiner*—Scott L. Hertzog
*Attorney, Agent, or Firm*—Stevens, Davis, Miller & Mosher, L.L.P.

[57] ABSTRACT

A composition used for an ingredient of printing ink, which comprises an organic pigment and a pigment derivative represented by the formula (I) in the acid form:

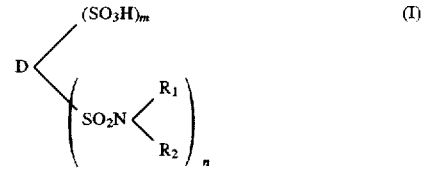

wherein D represents a residue of an organic pigment other than azo, $R_1$ represents a hydrogen atom or an unsaturated aliphatic, saturated aliphatic or aromatic hydrocarbon group having 1 to 20 carbon atoms, $R_2$ represents an unsaturated aliphatic, saturated aliphatic or aromatic hydrocarbon group having 1 to 20 carbon atoms, m represents a number of from 0 to 3 and n represents a number of from 1 to 4, provided that m+n is from 1 to 5.

5 Claims, No Drawings

COMPOSITION FOR PRINTING INKS

This application is a Continuation of application Ser. No. 08/814,059, filed Mar. 10, 1997, abandoned which is a Continuation of application Ser. No. 08/305,482, filed Sep. 13, 1994, now abandoned.

The present invention relates to a composition used ingredient of printing inks, which comprises an organic pigment and a pigment derivative.

Pigments contained in non-aqueous dispersions, such as printing inks, are often flocculated and cause various problems, such as precipitation of the ingredient, viscosity increase of dispersion, reduction of tinting strength, lowering of gloss, color separation when pigments of different types are mixed, and the like. There have been a number of proposals, particularly on phthalocyanine pigments or quinacridone pigments, in order to overcome problems accompanied by the flocculation of the pigments or lowering of fluidity. For example, methods of admixing the pigment with a pigment derivative which is obtained by introducing a sulfo group into a pigment or a metal salt thereof as described in JP-B-50-4019 ("JP-B-" means Japanese examined patent publication), admixing the pigment with a substituted aminomethyl derivative as described in JP-B-39-16787, and admixing the pigment with a phthalimidemethyl derivative as described in JP-A-55-108466 ("JP-A-" means Japanese unexamined patent publication) have been proposed. Further, as an improvement, methods of admixing the pigment with a sulfonamide derivative of diamine as described in JP-B-1-34268, admixing the pigment with a methylimidazole derivative as described in JP-A-1-213366, and the like have been known.

According to the above-mentioned methods, reduction of viscosity of the dispersion can be attained to a certain extent, but the effect is greatly affected according to the type of vehicles employed and the additional problems of reduction of tinting strength, lowering of gloss and the like have not yet been solved, so the effect thus far has not yet been satisfactory. Particularly for gravure printing inks, compounds which are effective to solve the above mentioned problems have not been known.

The present inventors have conducted extensive studies for solving the problems mentioned above and, as a result, found a pigment derivative which can solve the problems and completed the present invention.

The present invention provides a composition for an ingredient of printing ink, which comprises an organic pigment and a pigment derivative represented by the formula (I) in the acid form:

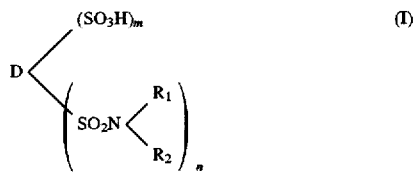

wherein D represents a residue of an organic pigment other than azo, $R_1$ represents a hydrogen atom or an unsaturated aliphatic, saturated aliphatic or aromatic hydrocarbon group having 1 to 20 carbon atoms, $R_2$ represents an unsaturated aliphatic, saturated aliphatic or aromatic hydrocarbon group having 1 to 20 carbon atoms, m represents a number of from 0 to 3 and n represents a number of from 1 to 4, provided that m+n is from 1 to 5.

Examples of the residues of organic pigments denoted by D in formula (I) include residues of dianthraquinonyl, anthrapyrimidine, flavanthrone, anthanthrone, indanthrone, pyranthrone, violanthrone, isoviolanthrone, quinacridone, quinophthalone, diketopyrrolopyrrole, dioxazine, isoindoline, phthalocyanine, perynone, perylene and thioindigo pigments, and the like.

The pigment derivative represented by the formula (I) may be produced according to a known method. As the example of the known method, a method of allowing the corresponding organic pigment to react with chlorosulfonic acid, followed by allowing the resulting compound to react with a monoamino compound represented by the formula $R_1$—NH—$R_2$, wherein $R_1$ and $R_2$ are as defined above, or a salt of the monoamino compound can be mentioned.

The reaction between the organic pigment and chlorosulfonic acid can be carried out, for example, by using organic solvent(s), if required, at the molar ratio of the organic pigment to chlorosulfonic acid being 1:1–10 at a temperature of from –10° C. to 150 ° C. A halogenation agent, such as thionyl chloride, phosphorus oxychloride, phosphorus pentachloride or the like, may be added thereto, if required. The substitution number denoted by m and n and total substitution number m+n in the formula (I) vary depending on the amount of chlorosulfonic acid or the reaction temperature.

The reaction between the resulting compound and the monoamino compound, or its salt, can be carried out, for example, in aqueous or an organic solvent at a temperature of from 0° to 150° C.

Examples of said monoamimo compounds include n-propylamine, n-butylamine, isobutylamine, n-hexylamine, 2-ethylhexylamine, aniline, di-n-propylamine, di-isopropylamine, di-isobutylamine, neopentylamine, octylamine, laurylamine, dilaurylamine, stearylamine, distearylamine and the like.

The sulfonic acid group in formula (I) may be either in the free acid form or in the form of a salt with a mono-, di- or trivalent metal or with a monoamino compound, such as the above mentioned monoamino compound.

As the examples of the mono-, di- or trivalent metal, sodium, potassium, magnesium, calcium, strontium, barium, aluminum and the like can be mentioned.

The metal salt or the organic amine salt of the pigment derivative can be easily obtained according to a known method, for example, by mixing an aqueous suspension of the pigment derivative with an aqueous solution or suspension of the metal or chloride of the organic amine.

The composition of the present invention can be produced by blending the pigment derivative with an organic pigment according to a known method.

Examples of said organic pigments include dianthraquinonyl, anthrapyrimidine, flavanthrone, anthanthrone, indanthrone, pyranthrone, violanthrone, isoviolanthrone, quinacridone, quinophthalone, diketopyrrolopyrrole, dioxazine, isoindoline, phthalocyanine, perynone, perylene and thioindigo pigments, and the like.

The preferred amount of the pigment derivative in the composition of the present invention is from 0.1 to 30 weight %, more preferably from 1 to 20%, based on the amount of organic pigment, The pigment derivative and the organic pigment can be blended, for example, by simply mixing their dry powders, the press cakes or the like, or mechanically mixing them by using one of various types of milling machines, such as kneaders, bead mills, attritors or the like. As the examples of other methods to blend them, the following methods can be mentioned:

adding dry powder of the pigment derivative or a suspension of the pigment derivative in water or an organic solvent into a suspension of the organic pigment in water or an organic solvent to deposit the pigment derivative onto the surface of the organic pigment;

dissolving the organic pigment and the pigment derivative in a solvent capable to dissolve both, such as sulfuric acid, then adding a poor solvent, such as water, to the solution to deposit both together.

The composition of the present invention exhibits excellent properties when it is used as an ingredient of printing inks, particularly when used for gravure printing inks where a mixture of nitrocellulose and polyamide, urethane or the like is used as the vehicle.

The composition of the present invention imparts lower viscosity, better fluidity and better tinting strength to the printing ink containing the composition, compared to the organic pigment being used without the pigment derivative.

The composition of the present invention does not normally cause color separation but can impart excellent properties, such as excellent gloss, to printing products with excellent workability.

The present invention will be illustrated in more detail bellow with reference to the following examples, which should never be construed as limiting the invention. In the example, "part" and "%" mean "part by weight" and "% by weight" respectively. Sulfonic acids are represented in the free acid form in the examples.

EXAMPLE 1

30 parts of crude C.I. Pigment Red 177 was added into 240 parts of chlorosulfonic acid. The resulting mixture was heated for 3 hours at 90° C., then poured into 2000 parts of iced water. The suspension thus obtained was filtered and then washed with water to obtain 160 parts of a filter cake of chlorosulfonated Red 177.

The filter cake of chlorosulfonated Red 177 thus obtained was added to 1000 parts of iced water and slurried. Into the slurry, 16 parts of n-propylamine was added. The resulting slurry was stirred for 3 hours at room temperature, then filtered, washed with water and dried to obtain pigment derivatives represented by the following formula.

5 parts of the pigment derivatives thus obtained was mixed with 95 parts of C.I. Pigment Red 177 by simply mixing their dry cakes to obtain 100 parts of a pigment composition.

EXAMPLE 2

3 parts of the pigment derivatives obtained in Example 1 was mixed with 97 parts of C.I. Pigment Red 177 by simply mixing their dry cakes to obtain a pigment composition.

EXAMPLE 3

10 parts of the pigment derivatives obtained in Example 1 was mixed with 90 parts of C.I. Pigment Red 177 by simply mixing their dry cakes to obtain a pigment composition.

EXAMPLE 4

40 parts of crude C.I. Pigment Violet 23 was added into 320 parts of chlorosulfonic acid. The resulting mixture was heated for 3 hours at 60° C., then poured into 3000 parts of iced water. The suspension thus obtained was filtered and then washed with water to obtain 240 parts of a filter cake of chlorosulfonated Violet 23.

The filter cake of chlorosulfonated Violet 23 thus obtained was added to 1000 parts of iced water and slurried. Into the slurry, 20 parts of isobutylamine was added. The resulting slurry was stirred for 3 hours at room temperature, then filtered, washed with water and dried to obtain pigment derivatives represented by the following formula.

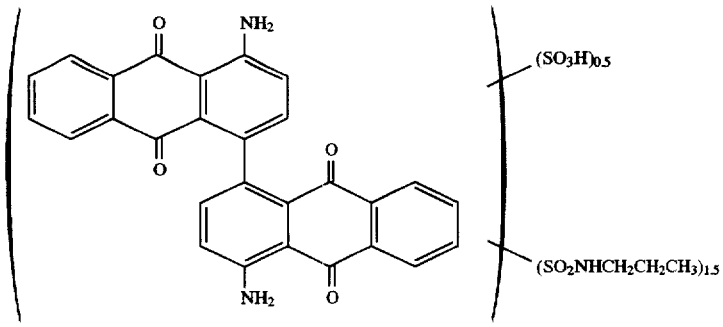

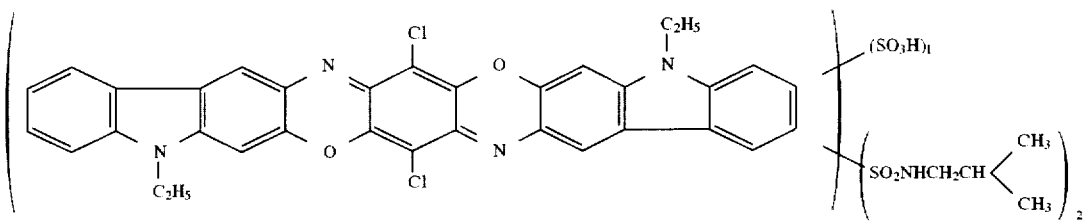

15 parts of the pigment derivatives thus obtained was mixed with 85 parts of C.I. Pigment Violet 23 by simply mixing their dry cakes to obtain 100 parts of a pigment composition.

EXAMPLE 5

3 parts of the pigment derivatives obtained in Example 4 was mixed with 97 parts of C.I. Pigment Violet 23 by simply mixing their dry cakes to obtain a pigment composition.

EXAMPLE 7

Example 6 was repeated except that 74 parts of stearylamine was used instead of 2-ethylhexylamine to obtain a pigment derivatives represented by the following formula.

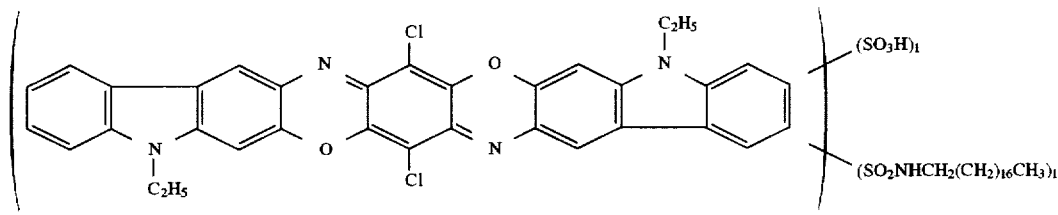

EXAMPLE 6

40 parts of crude C.I. Pigment Violet 23 was added into 320 parts of chlorosulfonic acid. The resulting mixture was kept for 3 hours at 0° C., then poured into 3000 parts of iced water. The suspension thus obtained was filtered and then washed with water to obtain 220 parts of a filter cake of chlorosulfonated Violet 23.

The filter cake of chlorosulfonated Violet 23 thus obtained was added to 1000 parts of iced water and slurried. Into the slurry, 70 parts of 2-ethylhexylamine was added. The resulting slurry was stirred for 3 hours at room temperature, then filtered, washed with water and dried to obtain pigment derivatives represented by the following formula.

15 parts of the pigment derivatives thus obtained was mixed with 85 parts of C.I. Pigment Violet 23 by simply mixing their dry cakes to obtain 100 parts of a pigment composition.

EXAMPLE 8

40 parts of crude C.I. Pigment Violet 23 was added into 320 parts of chlorosulfonic acid. The resulting mixture was kept for 3 hours at 0° C., then poured into 3000 parts of iced water. The suspension thus obtained was filtered and then washed with water to obtain 220 parts of a filter cake of chlorosulfonated Violet 23.

The filter cake of chlorosulfonated Violet 23 thus obtained was added to 1000 parts of iced water and slurried. Into the slurry, 35 parts of octylamine was added. The resulting

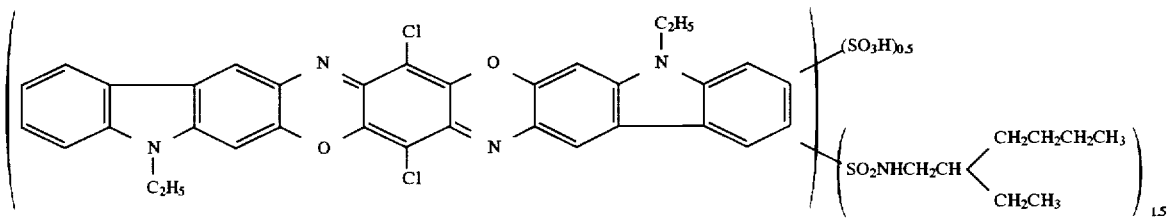

10 parts of the pigment derivatives thus obtained was mixed with 90 parts of C.I. Pigment Violet 23 by simply mixing their dry cakes to obtain 100 parts of a pigment composition.

slurry was stirred for 3 hours at room temperature, then filtered, washed with water and dried to obtain pigment derivatives represented by the following formula.

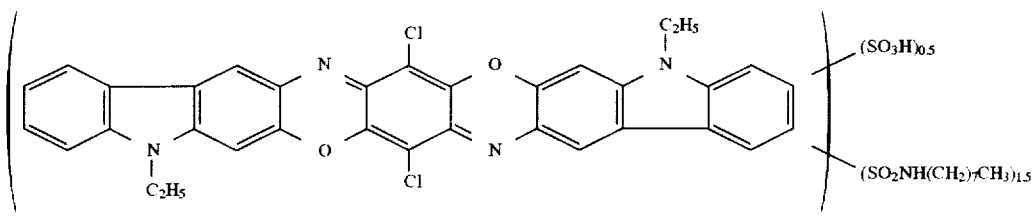

15 parts of the pigment derivatives thus obtained was mixed with 85 parts of C.I. Pigment Violet 23 by simply mixing their dry cakes to obtain 100 parts of a pigment composition.

EXAMPLE 9

30 parts of crude C.I. Pigment Blue 60 was added into 240 parts of chlorosulfonic acid. The resulting mixture was heated for 3 hours at 90° C., then poured into 2000 parts of iced water. The suspension thus obtained was filtered and then washed with water to obtain 180 parts of a filter cake of chlorosulfonated Blue 60.

The filter cake of chlorosulfonated Blue 60 thus obtained was added to 1000 parts of iced water and slurried. Into the slurry, 26 parts of di-isobutylamine was added. The resulting slurry was stirred for 3 hours at room temperature, then filtered, washed with water and dried to obtain pigment derivatives represented by the following formula.

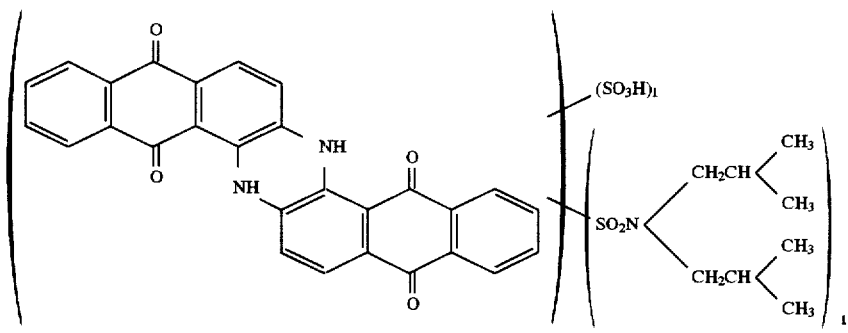

10 parts of the pigment derivatives thus obtained was mixed with 90 parts of C.I. Pigment Blue 60 by simply mixing their dry cakes to obtain 100 parts of a pigment composition.

EXAMPLE 10

30 parts of crude C.I. Pigment Red 179 was added into 240 parts of chlorosulfonic acid. The resulting mixture was heated for 3 hours at 90° C., then poured into 2000 parts of iced water. The suspension thus obtained was filtered and then washed with water to obtain 180 parts of a filter cake of chlorosulfonated Red 179.

The filter cake of chlorosulfonated Red 179 thus obtained was added to 1000 parts of iced water and slurried. Into the slurry, 54 parts of neopentylamine was added. The resulting slurry was stirred for 3 hours at room temperature, then filtered, washed with water and dried to obtain pigment derivatives represented by the following formula.

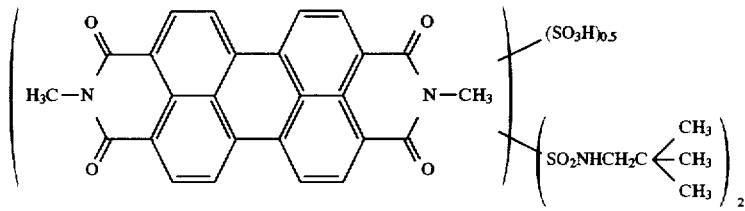

10 parts of the pigment derivatives thus obtained was mixed with 90 parts of C.I. Pigment Red 179 by simply mixing their dry cakes to obtain 100 parts of a pigment composition.

EXAMPLE 11

30 parts of crude C.I. Pigment Orange 43 was added into 240 parts of chlorosulfonic acid. The resulting mixture was heated for 3 hours at 90° C., then poured into 2000 parts of iced water. The suspension thus obtained was filtered and then washed with water to obtain 170 parts of a filter cake of chlorosulfonated Orange 43.

The filter cake of chlorosulfonated Orange 43 thus obtained was added to 1000 parts of iced water and slurried. Into the slurry, 25 parts of neopentylamine was added. The resulting slurry was stirred for 3 hours at room temperature, then filtered, washed with water and dried to obtain pigment derivatives represented by the following formula.

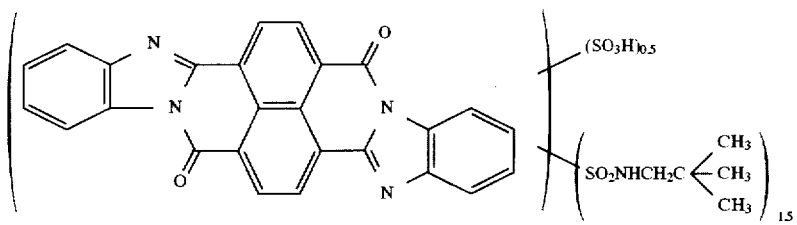

10 parts of the pigment derivatives thus obtained was mixed with 90 parts of C.I. Pigment Orange 43 by simply mixing their dry cakes to obtain 100 parts of a pigment composition.

Reference Example

Using nitrocellulose/polyamide varnish and the pigment composition obtained in Example 1–11 or pigments alone shown in Table 1–5, full shade inks were formulated and their viscosity and gloss were measured. Diluted color inks were formulated by mixing each of the full shade inks with nitrocellulose/polyamide varnish at the mixing ratio of 1:5 and their properties were measured according to methods described below:

Viscosity: Measured by using E type viscometer at 25° C., 30 rpm for each of the full shade inks.

Tinting strength: Onto a high quality paper, each of the diluted color inks were coated by using No. 2 Coater and dried, then color density was measured with the eye. The color density is illustrated as a relative value when the coloring density obtained in the case of the pigment alone is regarded as 100.

Gloss: Onto a film, each of the full shade inks were coated by using No. 2 Coater and dried, then gloss (60°—60°) was measured by Gloss meter manufactured by Suga Shikenki Co., Ltd. The gloss is illustrated as a relative value when the coloring density obtained in the case of the pigment alone is regarded as 100.

The results are shown in Table 1–5.

TABLE 1

| Composition used *1 | Viscosity (cps) | Tinting strength | Gloss |
|---|---|---|---|
| Example -1 | 26 | 105 | 109 |
| Example -2 | 28 | 103 | 108 |
| Example -3 | 23 | 110 | 110 |
| C.I. Pigment Red 177 | 41 | 100 | 100 |

TABLE 2

| Composition used *1 | Viscosity (cps) | Tinting strength | Gloss |
|---|---|---|---|
| Example -4 | 39 | 119 | 118 |
| Example -5 | 51 | 112 | 113 |
| Example -6 | 43 | 117 | 116 |
| Example -7 | 37 | 121 | 120 |
| Example -8 | 35 | 118 | 117 |

TABLE 2-continued

| Composition used *1 | Viscosity (cps) | Tinting strength | Gloss |
|---|---|---|---|
| C.I. Pigment Violet 23 | 72 | 100 | 100 |

TABLE 3

| Composition used *1 | Viscosity (cps) | Tinting strength | Gloss |
|---|---|---|---|
| Example -9 | 22 | 108 | 110 |
| C.I. Pigment Blue 60 | 45 | 100 | 100 |

TABLE 4

| Composition used *1 | Viscosity (cps) | Tinting strength | Gloss |
|---|---|---|---|
| Example -10 | 24 | 119 | 114 |
| C.I. Pigment Red 179 | 43 | 100 | 100 |

TABLE 5

| Composition used *1 | Viscosity (cps) | Tinting strength | Gloss |
|---|---|---|---|
| Example -11 | 21 | 111 | 108 |
| C.I. Pigment Orange 43 | 42 | 100 | 100 |

*1 described by the Example No. where the composition was prepared or when the organic pigment alone was used, described by name of the organic pigment.

What we claim is:

1. A composition for an ingredient of printing ink, which comprises an organic pigment and a pigment derivative represented by the formula (I) in the acid form:

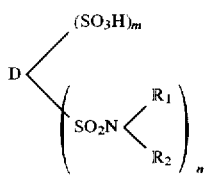

wherein D represents a residue of a dioxazine pigment, $R_1$ represents a hydrogen atom or an unsaturated aliphatic, saturated aliphatic or aromatic hydrocarbon group having 1 to 20 carbon atoms, $R_2$ represents an unsaturated aliphatic, saturated aliphatic or aromatic hydrocarbon group having 1 to 20 carbon atoms, m represents a number of from 0 to 3 and n represents a number of from 1 to 4, provided that m+n is from 1 to 5.

2. A composition according to claim 1 wherein the amount of the pigment derivative is from 0.1 to 30 weight % based on the amount of organic pigment.

3. A composition according to claim 1 wherein the organic pigment is dianthraquinonyl, anthrapyrimidine, flavanthrone, anthanthrone, indanthrone, pyranthrone, violanthrone, isoviolanthrone, quinacridone, quinophthalone, diketopyrrolopyrrole, dioxazine, isoindoline, phthalocyanine, perynone, perylene or thioindigo pigment.

4. A process of printing which comprises contacting a composition which comprises an organic pigment and a pigment derivative represented by the formula (I) in the acid form:

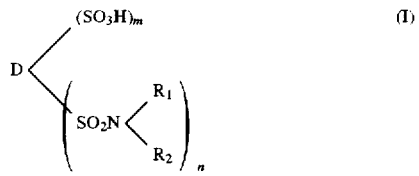

wherein D represents a residue of an organic pigment other than azo, $R_1$ presents a hydrogen atom or an unsaturated aliphatic, saturated aliphatic or aromatic hydrocarbon group having 1 to 20 carbon atoms, $R_2$ represents an unsaturated aliphatic, saturated aliphatic or aromatic hydrocarbon group having 1 to 20 carbon atoms, m represents a number of from 0 to 3 and n represents a number of from 1 to 4, provided that m+n is from 1 to 5, with a substrate to be printed.

5. An article of manufacture printed according to the process of claim 4.

\* \* \* \* \*